United States Patent [19]

van Broekhoven et al.

[11] Patent Number: 4,877,860

[45] Date of Patent: Oct. 31, 1989

[54] CATALYTIC COPOLYMERIZATION OF CARBON MONOXIDE/OLEFIN WITH KETONE/ALCOHOL DILUENT

[75] Inventors: Adrianus M. van Broekhoven; Richard L. Wife, both of CM Amsterdam, Netherlands

[73] Assignee: Shell Oil Company, Houston, Tex.

[21] Appl. No.: 225,996

[22] Filed: Jul. 29, 1988

[30] Foreign Application Priority Data

Jul. 30, 1987 [NL] Netherlands ............... 8701799

[51] Int. Cl.$^4$ ................................... C08G 67/02
[52] U.S. Cl. ......................................... 528/392
[58] Field of Search ............................. 528/392

[56] References Cited

U.S. PATENT DOCUMENTS

| | | | |
|---|---|---|---|
| 2,495,286 | 1/1950 | Brubaker | 260/63 |
| 3,083,184 | 3/1963 | Loeb | 528/392 |
| 3,689,460 | 9/1972 | Nozaki | 260/63 |
| 3,694,412 | 9/1972 | Nozaki | 260/63 |
| 3,780,140 | 12/1973 | Hammer | 528/392 |
| 4,137,382 | 1/1979 | Vetter | 528/392 |
| 4,810,774 | 3/1989 | Drent | 528/392 |

FOREIGN PATENT DOCUMENTS

| | | |
|---|---|---|
| 0121965 | 10/1984 | European Pat. Off. . |
| 0181014 | 5/1986 | European Pat. Off. . |
| 222454 | 5/1987 | European Pat. Off. . |
| 257663 | 4/1988 | European Pat. Off. . |
| 1081304 | 3/1965 | United Kingdom . |

*Primary Examiner*—Harold D. Anderson
*Attorney, Agent, or Firm*—Dean F. Vance

[57] ABSTRACT

In the process of producing a linear alternating polymer of carbon monoxide and at least one ethylenically unsaturated hydrocarbon in a diluent in the presence of a palladium salt, the anion of a strong non-hydrohalogenic acid, and a phosphine ligand, improved polymer bulk density and polymerization rates are obtained when employing as the diluent a ketone/alcohol mixture having at least 50% by volume of an aliphatic ketone which has at most 10 carbon atoms and at least 5% by volume of an aliphatic alcohol which has at most 10 carbon atoms.

14 Claims, No Drawings

CATALYTIC COPOLYMERIZATION OF CARBON MONOXIDE/OLEFIN WITH KETONE/ALCOHOL DILUENT

FIELD OF THE INVENTION

This invention relates to an improved process for the production of linear alternating polymers of carbon monoxide and at least one ethylenically unsaturated hydrocarbon. More particularly, the invention relates to an improved process wherein the carbon monoxide and hydrocarbon(s) are contacted in an organic diluent in the presence of a catalyst composition formed from a palladium salt, the anion of a strong non-hydrohalogenic acid and a phosphine ligand.

BACKGROUND OF THE INVENTION

Polymers of carbon monoxide and ethylenically unsaturated hydrocarbons have been known for some time. Brubaker, U.S. Pat. No. 2,495,286, produced such polymers of relatively low carbon monoxide content in the presence of free radical initiators, e.g., peroxy compounds. U.K. 1,081,304 discloses the production of similar polymers of higher carbon monoxide content in the presence of alkylphosphine complexes of palladium salts as catalyst. Nozaki extended this reaction to produce linear alternating polymers in the presence of arylphosphine complexes of palladium moieties and certain inert solvents. See, for example, U.S. Pat. No. 3,689,460 and U.S. Pat. No. 3,694,412.

More recently, the class of linear alternating polymers of carbon monoxide and ethylenically unsaturated hydrocarbons has become of greater interest in part because of the greater availability of the polymers in quantity. Production of this class of polymers, also known as polyketones or polyketone polymers, is illustrated by a number of Published European Applications including 121,965 and 181,014 and by copending U.S. patent application Ser. No. 930,468 filed Nov. 14, 1986. These references illustrate the production of linear alternating polymers of carbon monoxide and ethylenically unsaturated hydrocarbons in the presence of catalyst compositions formed from a compound of palladium, cobalt or nickel, the anion of a non-hydrohalogenic acid having a pKa less than about 6, and a bidentate ligand of phosphorus, arsenic or antimony.

In general, these polymerization catalyst compositions are mixed with the monomers in an organic diluent in which the polymers are insoluble. During the polymerization process the polymers are obtained in the form of a suspension in the diluent. Generally, the polymerization is terminated by cooling and releasing the pressure after the required degree of polymerization is reached. The polymers can be isolated from the suspension for instance by filtration or centrifugation. Organic diluents that have been found very suitable are aliphatic alcohols having at most 10 carbon atoms in the molecule such as methanol, ethanol and propanol.

With a view to their uses, the polymers are more valuable when their molecular weights are higher. The molecular weights of the polymers can be influenced by the temperature at which the polymerization is carried out, in that at otherwise similar reaction conditions, a decrease in reaction temperature will lead to a higher molecular weight. However, a decrase in reaction temperature will be attended with two further effects. First, a decrease in reaction temperature will bring with it a fall in polymerization rate. Second, a decrease in reaction temperature will lead to a decreased polymer bulk density.

By replacing the alcohols partly or wholly with other diluents, such as aliphatic ketones having at most 10 carbon atoms in the molecule, aliphatic carboxylic acid esters, or aliphatic hydrocarbons, an increase in molecular weights could be attained as shown in U.S. Pat. No. 4,810,774, but this increase was in all known examples accompanied with a severe drop in polymerization rate and more often than not a fall in polymer bulk density was observed.

SUMMARY OF THE INVENTION

This invention is an improved process of producing linear alternating polymers of carbon monoxide and at least one ethylenically unsaturated hydrocarbon. More particularly, the invention relates to the production of such linear alternating polymers in a diluent that contains a catalyst composition formed from a palladium salt, the anion of a strong non-hydrohalogenic acid, and a phosphine ligand wherein the diluent is a ketone/alcohol mixture having more than 50% by volume of aliphatic ketones having at most 10 carbon atoms and more than 5% by volume of aliphatic alcohols having at most 10 carbon atoms. The use of the diluent of the present invention results in an improved rate of polymerization for high bulk density polymers.

DESCRIPTION OF THE INVENTION

In the process of the invention, linear alternating polymers of carbon monoxide and at least one ethylenically unsaturated hydrocarbon are produced by contacting the carbon monoxide and hydrocarbon(s) in a diluent mixture of ketones and alcohols that contains a catalyst composition formed from a palladium compound, the anion of a non-halohalogenic acid having a pKa below about 6, and a phosphine ligand of defined structure.

The palladium compound percursor of the catalyst compositions is the salt of palladium and an acid, organic or inorganic. The palladium salt is preferably a palladium carboxylate, especially the palladium salt of a mono- or dicarboxylic acid. The preferred palladium carboxylates are palladium alkanoates of up to about 10 carbon atoms. While palladium alkanoates such as palladium propionate, palladium butyrate or palladium octanoate are usefully employed in the process of the invention, the preferred palladium alkanoate is palladium acetate.

The anion precursor of the catalyst composition of the invention is the anion of a non-hydrohalogenic acid having a pKa below about 6 and preferably below about 2, as determined in aqueous solution at 18° C. Preferred anions are anions of oxygen-containing acids including anions of inorganic acids such as sulfuric acid, perchloric acid, phosphoric acid and nitrous acid as well as organic acids including sulfonic acids such as p-toluenesulfonic acid, trifluoromethanesulfonic acid, 2-hydroxypropane-2-sulfonic acid and methanesulfonic acid and carboxylic acids such as trifluoroacetic acid, trichloroacetic acid, dichloroacetic acid, difluoroacetic acid, tartaric acid and 2,5-dihydroxybenzoic acid. Trifluoroacetic acid and p-toluenesulfonic acid comprise a preferred class of acids whose anions are suitable in the process of the present invention, particularly trifluoroacetic acid. The anion is employed in a quantity from about 0.5 equivalent to about 200 equivalents per gram-atom of palladium (as the compound), preferably from about 1 equivalent to about 100 equivalents of the anion per gram atom of palladium.

The anion is preferably provided as the acid but in alternate modifications the anion is provided in the form of a salt. When a salt is employed to provide the anion, non-noble transition metal salts, i.e., salts of metals of Groups IIIB-VIIB of the Periodic Table of Elements, are usefully employed. Particularly suitable salts include those salts of copper, zirconium and vanadium. In the modifications where the anion is provided as a non-noble transition metal salt, copper salts are preferred. In yet another modification, it is suitable to provide the palladium and the anion as a single compound, e.g., the palladium p-toluenesulfonate acetonitrile complex formed by reacting palladium chloride with silver p-toluenesulfonate in acetonitrile.

The phosphine ligand employed as precursor of the catalyst composition of the invention is preferably a 1,3-bis(diarylphosphino)propane wherein the propane moiety is substituted in the 2 position with two hydrocarbyl substituents. A preferred class of such bidentate phosphorus ligands are represented by the formula

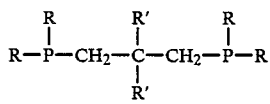

wherein R independently is monovalent aryl of from 6 to 20 carbon atoms inclusive and is a hydrocarbyl aryl group or is a substituted hydrocarbyl group wherein any non-hydrocarbyl substituents are polar substituents, particular alkoxy. Illustrative of suitable R groups are phenyl, naphthyl, tolyl, 2,4-dimethylphenyl, 2-methoxyphenyl, 2-ethoxynaphthyl, 3-propoxyphenyl, 2-methyl-4-methoxyphenyl, 2,4-dimethoxyphenyl and 2-propoxyphenyl. R' independently is a hydrocarbyl group of up to 10 carbon atoms and is an alkyl group such as methyl, ethyl, hexyl or decyl, or is aryl including alkaryl such as phenyl, naphthyl, tolyl or xylyl. Preferred R' groups are alkyl, particularly methyl. The R groups are the same or are different but preferably are the same. For best results at least one but preferably each R group is phenyl substituted with a polar substituent, particularly alkoxy, in a position ortho to the phosphorus, i.e., a 2-alkoxyphenyl substituent.

As disclosed in U.S. patent application No. 222,993 filed July 22, 1988 the carbon atoms in the propane moiety of the phosphine ligand can be substituted with silicon, preferably at the 2 position, without significantly changing the polymerization rate. The silicon substituted compounds have the advantage of being produced in higher yields.

Illustrative of suitable bidentate phosphorus ligands are 2,2-dimethyl-1,3-bis[di(2-methoxyphenyl)phosphino]propane; 2,2-dimethyl-1,3-bis[di(2-methoxyphenyl)phosphino]-2-silapropane; 2,2-dimethyl-1,3-bis(diphenylphosphino)propane; 2,2-dimethyl-1,3-bis(diphenylphosphino)-2-silapropane; 2-methyl-2-phenyl-1,3-bis(diphenylphosphino)propane; 2,2-diethyl-1,3-bis[di(2-methoxy-4-methylphenyl)phosphino]propane; 2,2-dipropyl-1,3-bis[di(4-methylphenyl)phosphino]propane and 2-methyl-2-butyl-1-(2-methoxyphenyl)-3-(2,6-diethoxyphenyl)propane. The class of 2,2-dimethyl-substituted phosphino propanes and silapropanes are preferred. The bidentate phosphorus ligands are suitably employed in a quantity of from about 0.1 mol to about 2 mol per mol of palladium compound, preferably in a quantity from about 0.75 mol to about 1.5 mol of palladium compound.

The activity of the catalyst composition is enhanced on occasion by the additional incorporation into the catalyst composition of a quinone. A variety of quinones are suitably employed as optional catalyst composition enhancers, including benzoquinone, naphthoquinone and anthraquinone. In general, when a quinone is employed, 1,4-quinones are preferred and particularly preferred is 1,4-benzoquinone. The use of a quinone is not required, but when a quinone is employed quantities of quinone up to 1000 mol of quinone per gram atom of palladium are useful, particularly amounts of quinone from about 25 mol to about 250 mol per gram atom of palladium.

The polymerization process comprises contacting the catalyst composition with carbon monoxide and at least one ethylenically unsaturated hydrocarbon. Suitable ethylenically unsaturated hydrocarbons have up to 20 carbon atoms inclusive, preferably up to 10 carbon atoms, and are aliphatic including ethylene and other alpha-olefins such as propylene, butylene, isobutylene, 1-hexene, 1-octene and 1-dodecene, or are arylaliphatic having an aryl substituent on a carbon atom of the ethylenic unsaturation, e.g., styrene, m-propylstyrene, p-methylstyrene and p-ethylstyrene. The members of the class of alpha-olefins are preferred as precursors of the linear alternating polymers. Preferred polymers are copolymers of carbon monoxide and ethylene or terpolymers of carbon monoxide, ethylene and propylene.

The polymers of the invention are linear alternating polymers having substantially one mole of carbon monoxide for each mole of hydrocarbon. When copolymers are desired, the total quantity of hydrocarbon will consist of a single ethylenically unsaturated hydrocarbon but when terpolymers are desired, the molar ratio of a first hydrocarbon, preferably ethylene, to the second hydrocarbon will be from about 1:1 to about 400:1, preferably from about 10:1 to about 100:1.

The catalyst composition is provided in a catalytic quantity. Suitable quantities of catalyst composition are those which provide from about $1\times10^{-7}$ to about $1\times10^{-3}$ gram atom of palladium per mol of ethylenically unsaturated hydrocarbon, preferably from about $1\times10^{-6}$ to about $1\times10^{-4}$ gram atom of palladium per mole of unsaturated hydrocarbon. The molar ratio of ethylenically unsaturated hydrocarbon to carbon monoxide is from about 10:1 to about 1.5, preferably from about 5:1 to about 1:2.

In the process of the invention the polymerization is carried out in a ketone/alcohol mixture comprising more than 50% by volume of one or more ketones having at most 10 carbon atoms and more than 5% by volume of one or more alcohols having at most 10 carbon atoms. Preference is given to the use of ketone/alcohol mixtures comprising less than 25% by volume of alcohol. Examples of suitable ketones are acetone, methyl ethyl ketone, diethyl ketone, ethyl propyl ketone, dipropyl ketone and methyl isobutyl ketone. By preference, ketones having three or four carbon atoms in the molecule are used in the diluent. Examples of suitable alcohols are methanol, ethanol, n-propanol, isopropanol, n-butanol, isobutanol, n-pentanol and n-hexanol and glycol. By preference, alcohols having one or two carbon atoms in the molecule are used in the diluent. Preference is further given to the use of diluents containing only one ketone and only one alcohol, such as a mixture of acetone with methanol or a mixture of methyl ethyl ketone with methanol.

The method of contacting the reactants and the catalyst composition is not critical and contact is maintained by conventional methods such as stirring or shaking. Typical reaction temperatures are from about 20° C. to about 200° C. and preferably are from about 30° C. to 150° C. Typical reaction pressures are from about 1 bar to about 200 bar, but more often are from about 20 bar to about 100 bar. Subsequent to reaction, the polymer product is recovered by conventional methods such as filtration or decantation. The polymer product will on occasion contain residues of the catalyst composition which are removed, if desired, by treatment with a solvent or a complexing agent which is selective for the residues.

Of particular interest are the polymers having a molecular weight from about 1,000 to about 200,000, but preferably from about 10,000 to about 50,000. Such polymers typically have a melting point from about 175° C. to about 300° C. and a limiting viscosity number (LVN), measured in a standard capillary viscosity measuring device in m-cresol at 60° C., of from about 0.5 to about 10.

The polymer products are known materials of established utility as premium thermoplastics. By way of illustration, the polymers are processed by known methods such as extrusion or injection molding into sheets, films, plates and shaped articles which are useful in the packaging industry and in the production of containers such as for food and drink. The polymers find additional application in the production of both internal and external parts for automotive applications.

The invention is further illustrated by the following Comparative Examples (not of the invention) and the following Examples (of the invention). For each of the copolymers, the $^{13}$C-NMR analysis was consistent with a linear alternating structure and confirmed that the copolymer comprised units of the repeating formula —CO—(CH$_2$—CH$_2$)—.

COMPARATIVE EXAMPLE 1

A carbon monoxide/ethylene copolymer was produced by the following procedure. A mechanically stirred autoclave was charged with 250 ml of methanol. The contents of the autoclave were brought to 85° C. and an equimolar mixture of carbon monoxide and ethylene was introduced until a pressure of 55 bar was reached. A catalyst solution was then introduced into the autoclave which consisted of 5.5 ml of methanol, 0.02 mmol of palladium acetate, 0.04 mmol of p-toluenesulfonic acid and 0.02 mmol of 1,3-bis(diphenylphosphino)propane. The pressure was maintained at 55 bar by continuing addition of the equimolar carbon monoxide/ethylene mixture. After 3 hours, the polymerization was terminated by cooling the reactor to ambient temperature and releasing the pressure. The polymer product was recovered by filtration, washed with methanol and dried at 50° C.

The polymer product had an LVN of 0.4 dl/g and a bulk density of 0.12 g/ml was obtained. The polymerization rate was 3000 g copolymer/g palladium/hour.

COMPARATIVE EXAMPLE 2

A carbon monoxide/ethene copolymer was prepared substantially in the same way as the copolymer of Comparative Example 1, except that now the polymerization temperature employed was 62° C. instead of 85° C. A copolymer having an LVN of 1.2 dl/g and a bulk density of 0.09 g/ml was obtained. The polymerization rate was 820 g copolymer/g palladium/hour.

COMPARATIVE EXAMPLE 3

A carbon monoxide/ethene copolymer was prepared substantially in the same way as the copolymer of Comparative Example 1, except for the following differences:

(a) 250 ml of acetone instead of 250 ml of methanol was introduced into the autoclave, (b) the catalyst solution contained 5.5 ml of acetone instead of 5.5 ml of methanol, and (c) the polymerization time was 1.5 hours instead of 3 hours.

A copolymer having an LVN of 1.0 dl/g and a bulk density of 0.07 g/ml was obtained. The polymerization rate was 730 g copolymer/g palladium/hour.

COMPARATIVE EXAMPLE 4

A carbon monoxide/ethene copolymer was prepared substantially in the same way as the copolymer of Comparative Example 1, except that the autoclave was charged with a mixture of 225 ml of methyl propionate and 19.5 ml of methanol instead of 250 ml of methanol. A copolymer having an LVN of 0.7 dl/g and a bulk density of 0.09 g/ml was obtained. The polymerization rate was 1100 g copolymer/g palladium/hour.

COMPARATIVE EXAMPLE 5

A carbon monoxide/ethene copolymer was prepared substantially in the same way as the copolymer of Comparative Example 1, except that the autoclave was charged with a mixture of 144.5 ml of methanol and 50 ml of n-heptane instead of 250 ml of methanol. A copolymer having an LVN of 0.8 dl/g and a bulk density of 0.12 g/ml was obtained. The polymerization rate was 2300 g copolymer/g palladium/hour.

EXAMPLE 6

To illustrate the present invention, a carbon monoxide/ethene copolymer was prepared substantially in the same way as the copolymer of Comparative Example 1, except for the following differences:

(a) the autoclave was charged with a mixture of 170 ml of methyl ethyl ketone and 24.5 ml of methanol instead of 250 ml of methanol, and (b) the polymerization time was 4.7 hours instead of 3 hours.

A copolymer having an LVN of 0.9 dl/g and a bulk density of 0.20 g/ml was obtained. The polymerization rate was 3000 g copolymer/g palladium/hour.

COMPARATIVE EXAMPLE 7

A carbon monoxide/ethene copolymer was prepared substantially in the same way as the copolymer of Comparative Example 1, except that the catalyst solution comprised 0.023 mmol of 2-methyl-2-(diphenyl-phosphinomethyl)-1,3-bis(diphenyl-phosphino) propane instead of 0.023 mmol of 1,3-bis(diphenyl-phosphino) propane. A copolymer having an LVN of 0.4 dl/g and a bulk density of 0.10 g/ml was obtained. The polymerization rate was 4500 g copolymer/g palladium/hour.

EXAMPLE 8

A carbon monoxide/ethene copolymer was prepared substantially in the same way as the copolymer of Comparative Example 7, except for the following differences:

(a) the autoclave was charged with a mixture of 225 ml of acetone and 19.5 ml of methanol instead of 250 ml of methanol, and (b) the polymerization time was 2.6 hours instead of 3 hours.

A copolymer having an LVN of 0.6 dl/g and a bulk density of 0.24 g/ml was obtained. The polymerization rate was 4600 g copolymer/g palladium/hour.

COMPARATIVE EXAMPLE 9

A carbon monoxide/ethene copolymer was prepared substantially in the same way as the copolymer of Comparative Example 7, except for the following differences:

(a) the autoclave was charged with 250 ml of acetone instead of 250 ml of methanol, and (b) the catalyst solution comprised 0.023 mmol of 2-methyl-2-(diphenyl-phosphino-methyl)-1,3-bis(diphenyl-phosphino) propane instead of 0.023 mmol of 1,3-bis(diphenyl-phosphino) propane, and 5.5 ml of acetone instead of 5.5 ml of methanol.

A copolymer having an LVN of 0.6 dl/g and a bulk density of 0.08 g/ml was obtained. The polymerization rate was 1000 g copolymer/g palladium/hour.

Of Examples 1-9, Examples 6 and 8 are examples according to the invention. In these examples, the monomers were contacted with a solution of the catalyst composition in a ketone/alcohol mixture comprising more than 50% by volume of a ketone having up to 10 carbon atoms and more than 5% by volume of an alcohol having up to 10 carbon atoms. Comparative Examples 1-5, 7 and 9 are outside the scope of the invention and have been included in the patent application for comparison. In Comparative Examples 1, 2 and 7 the polymerization was carried out in methanol as the diluent and in Comparative Examples 3 and 9, in acetone as the diluent. In Comparative Examples 4 and 5, the diluents used were a mixture of methyl propionate and methanol, and a mixture of n-heptane and methanol, respectively.

Comparison of the results of Comparative Examples 1 and 2 demonstrates that when the polymerization is carried out in methanol as the diluent, reduction of the reaction temperature of from 85° to 62° C. leads to a rise in LVN of from 0.4 to 1.2 dl/g, combined with a decrease in bulk density of from 0.12 to 0.09 g/ml and a decrease in polymerization rate of from 3000 to 820 g/g/hour. Comparison of the results of Comparative Example 1 with those of Comparative Example 3 and those of Comparative Example 7 with those of Comparative Example 9 shows that replacing methanol as the diluent by acetone, has the same effect as a decrease in reaction temperature, viz. a rise in LVN combined with a fall in bulk density and polymerization rate. This phenomenon is also encountered when part of the methanol is replaced by methyl propionate, as in Comparative Example 4. In the partial replacement of methanol by n-heptane executed in Comparative Example 5, a fall in polymerization rate was observed besides a rise in LVN.

Comparison of the results of Comparative Example 1 with those of Example 6 and of the results of Comparative Example 7 with those of Example 8 shows that when part of the methanol is replaced by methyl ethyl ketone or acetone, in such a proportion that the diluent thus obtained comprises more than 50% by volume of ketone and more than 5% by volume of alcohol, a rise in LVN occurs, combined with a marked rise in the bulk density, whereas the polymerization rate remains constant.

What is claimed is:

1. In the process of producing linear alternating polymers of carbon monoxide and at least one ethylenically unsaturated hydrocarbon, by contacting the carbon monoxide and unsaturated hydorcarbon under polymerization conditions in a diluent in the presence of a catalyst composition formed from a palladium salt, the anion of a non-hydrohalogenic acid having a pKa below about 6, and a phosphine ligand, the improvement wherein the diluent is a ketone/alcohol mixture comprising more than 50% by volume of aliphatic ketones which have at most 10 carbon atoms and more than 5% by volume of aliphatic alcohols which have at most 10 carbon atoms.

2. The process of claim 1 wherein the phosphine ligand is of the formula

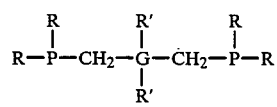

wherein R independently is monovalent aryl of from 6 to 20 carbon atoms inclusive, R' independently is hydrocarbyl of up to 10 carbon atoms, and G is carbon or silicon.

3. The process of claim 2 wherein each R is ortho-alkoxyphenyl and R' independently is alkyl.

4. The process of claim 3 wherein the alkoxy is methoxy and each R' is methyl.

5. The process of claim 2 wherein each R is phenyl and each R' is methyl.

6. The process of claim 1, wherein said catalyst composition includes a 1,4-quinone.

7. The process of claim 6, wherein said 1,4-quinone is 1,4-benzoquinone or 1,4-napthoquinone and the quantity of 1,4-quinone is 25-250 mol per gram atom of palladium.

8. The process of claim 1, wherein the ketone/alcohol mixture comprises less than 25% by volume of at least one alcohol.

9. The process of claim 1, wherein at least one of the ketones in the ketone/alcohol mixture contain three or four carbon atoms in each molecule.

10. The process of claim 1, wherein at least one of the alcohols in the ketone/alcohol mixture contain one or two carbon atoms in each molecule.

11. The process of claim 1, wherein the ketone/alcohol mixture comprises only one ketone and only one alcohol.

12. The process of claim 11, wherein the diluent is a mixture of acetone with methanol or a mixture of methyl ethyl ketone with methanol.

13. The process of claim 1, wherein the anion of the non-hydrohalogenic acid has a pKa below about 2.

14. The process of claim 13, wherein the anion of the acid is an anion of sulphonic acid or an anion of carboxylic acid.

* * * * *